US011919301B2

(12) United States Patent
Hashimoto et al.

(10) Patent No.: US 11,919,301 B2
(45) Date of Patent: Mar. 5, 2024

(54) LIQUID EJECTING APPARATUS

(71) Applicant: Seiko Epson Corporation, Tokyo (JP)

(72) Inventors: Atsuhiro Hashimoto, Shiojiri (JP); Ryosuke Tsuchihashi, Matsumoto (JP)

(73) Assignee: Seiko Epson Corporation (JP)

( * ) Notice: Subject to any disclaimer, the term of this patent is extended or adjusted under 35 U.S.C. 154(b) by 162 days.

(21) Appl. No.: 17/699,221

(22) Filed: Mar. 21, 2022

(65) Prior Publication Data

US 2022/0297425 A1 Sep. 22, 2022

(30) Foreign Application Priority Data

Mar. 22, 2021 (JP) ................................ 2021-047855

(51) Int. Cl.
*B41J 2/045* (2006.01)

(52) U.S. Cl.
CPC ....... *B41J 2/04573* (2013.01); *B41J 2/04581* (2013.01)

(58) Field of Classification Search
CPC ......................... B41J 2/04581; B41J 2/04573; B41J 2/04516; B41J 2/04588; B41J 2/04595; B41J 2202/06; B41J 2/04503; B41J 2/04505; B41J 2/04506; B41J 2/04508; B41J 2/0451; B41J 2/04513; B41J 2/04526; B41J 2/04596; B41J 2/04535; B41J 2/0456; B41J 2/04561; B41J 2/04568; B41J 2/04571
See application file for complete search history.

(56) References Cited

U.S. PATENT DOCUMENTS

2015/0258829 A1* 9/2015 Shinkawa ............ B41J 2/14274 347/14
2017/0225454 A1* 8/2017 Yoshida ............... B41J 2/17566
2020/0156369 A1* 5/2020 Matsunaga .......... B41J 2/04588

FOREIGN PATENT DOCUMENTS

JP 2017-095814 A 6/2017

* cited by examiner

*Primary Examiner* — Kristal Feggins
(74) *Attorney, Agent, or Firm* — Harness, Dickey & Pierce, P.L.C.

(57) ABSTRACT

A liquid ejecting apparatus includes ejecting sections that eject droplets from nozzles according with a driving signal supplied thereto. The driving signal includes a plurality of ejection pulses during one cycle. The plurality of ejection pulses includes a final ejection pulse corresponding to a final droplet. The final ejection pulse includes an expansion element that expands a pressure chamber, an expansion-maintaining element that maintains the expansion of the pressure chamber, a contraction element that contracts the pressure chamber, and a vibration-damping element that reduces residual vibration of liquid in the pressure chamber. The time width of the sum of the expansion element and the expansion-maintaining element of the final ejection pulse is longer than a length that is 0.5 multiplied by the natural-vibration cycle of the ejecting sections, and is shorter than a length that is 1.0 multiplied by the natural-vibration cycle.

5 Claims, 13 Drawing Sheets

FIG. 10

| EJECTION PULSE Pw | | MODEL 1 | MODEL 2 | MODEL 3 |
|---|---|---|---|---|
| SPEED DIFFERENCE | | LARGE | MEDIUM | SMALL |
| EJECTION TIMING | ELEMENT a1 [μs] | 1.6 | 1.6 | 1.6 |
| | ELEMENT b1 [μs] | 2.2 | 3.8 | 5.4 |
| | PERIOD Tab1 | 0.48 Tc | 0.68 Tc | 0.88 Tc |
| ELEMENT c1 [μs] | | 2.75 | 2.75 | 2.75 |
| SPEED Vm1 [m/s] | | 8.5 | 8.5 | 8.5 |

FIG. 14

| | PERIOD Tab3 | DETERMINATION OF AERIAL COALESCENCE | DETERMINATION OF TAIL | DETERMINATION OF MIST | COMPREHENSIVE DETERMINATION |
|---|---|---|---|---|---|
| COMPARATIVE EXAMPLE 1 | 0.40 Tc | A | C | C | C |
| EXAMPLE 1 | 0.50 Tc | A | B | B | B |
| EXAMPLE 2 | 0.60 Tc | A | B | A | A |
| EXAMPLE 3 | 0.70 Tc | B | B | A | A |
| EXAMPLE 4 | 0.80 Tc | C | A | A | B |
| EXAMPLE 5 | 0.90 Tc | C | A | A | B |
| EXAMPLE 6 | 1.00 Tc | C | A | A | B |
| COMPARATIVE EXAMPLE 2 | 1.10 Tc | D | B | B | C |

FIG. 15

| | PERIOD Tab3 | DETERMINATION OF AERIAL COALESCENCE | DETERMINATION OF TAIL | DETERMINATION OF MIST | COMPREHENSIVE DETERMINATION |
|---|---|---|---|---|---|
| EXAMPLE 7 | 0.53 Tc | A | B | B | B |
| EXAMPLE 8 | 0.56 Tc | A | B | A | A |
| EXAMPLE 9 | 0.59 Tc | A | B | A | A |
| EXAMPLE 10 | 0.62 Tc | A | B | A | A |
| EXAMPLE 11 | 0.65 Tc | A | B | A | A |
| EXAMPLE 12 | 0.68 Tc | A | B | A | A |
| EXAMPLE 13 | 0.71 Tc | B | B | A | B |
| EXAMPLE 14 | 0.74 Tc | B | B | A | B |
| EXAMPLE 15 | 0.77 Tc | C | A | A | B |

LIQUID EJECTING APPARATUS

The present application is based on, and claims priority from JP Application Serial Number 2021-047855, filed Mar. 22, 2021, the disclosure of which is hereby incorporated by reference herein in its entirety.

BACKGROUND

1. Technical Field

The present disclosure relates to a liquid ejecting apparatus.

2. Related Art

A liquid ejecting apparatus described in JP-A-2017-95814 supplies a driving signal to a driving element and generates a pressure variation in liquid in a pressure chamber to eject droplets from a nozzle. The liquid ejecting apparatus makes a first ink droplet and a second ink droplet ejected from the nozzle coalesce before the first ink droplet and the second ink droplet land on a medium.

A liquid ejecting apparatus in the related art supplies a driving signal including a plurality of ejection pulses having different waveform shapes to a driving element, to make a plurality of droplets coalesce before the plurality of droplets land on a medium. To make the plurality of droplets ejected by the plurality of ejection pulses coalesce before the plurality of droplets land on a medium, it is necessary to make the speed of a droplet ejected later faster than the speed of a droplet ejected earlier. When the speed of a droplet ejected later is made faster, however, there is a problem that a mist is more likely to be generated.

SUMMARY

A liquid ejecting apparatus according to an aspect of the present disclosure includes an ejecting section including a nozzle that ejects liquid to be landed on a medium, a pressure chamber that communicates with the nozzle, and a driving element supplied with a driving signal to generate a pressure variation in liquid in the pressure chamber, and a driving-signal generation unit that generates the driving signal. The driving signal includes a plurality of ejection pulses for ejecting a plurality of droplets during one cycle. The plurality of droplets due to the plurality of ejection pulses coalesces before landing on the medium. The plurality of ejection pulses includes a final ejection pulse that corresponds to a final droplet ejected last from the nozzle among the plurality of droplets, and a preceding ejection pulse that corresponds to a preceding droplet, among the plurality of droplets, ejected from the nozzle before the final droplet. The preceding ejection pulse includes a first expansion element that expands the pressure chamber, a first expansion-maintaining element that maintains expansion of the pressure chamber by the first expansion element, a first contraction element that contracts the pressure chamber expanded by the first expansion element, and a first vibration-damping element that, after the first contraction element contracts the pressure chamber, expands the pressure chamber to reduce residual vibration of liquid in the pressure chamber. The final ejection pulse includes a second expansion element that expands the pressure chamber, a second expansion-maintaining element that maintains expansion of the pressure chamber by the second expansion element, a second contraction element that contracts the pressure chamber expanded by the second expansion element, and a second vibration-damping element that, after the second contraction element contracts the pressure chamber, expands the pressure chamber to reduce residual vibration of liquid in the pressure chamber. A time width of a sum of the second expansion element and the second expansion-maintaining element of the final ejection pulse is longer than a length that is 0.5 multiplied by a natural-vibration cycle of the ejecting section, and is shorter than a length that is 1.0 multiplied by the natural-vibration cycle of the ejecting section.

BRIEF DESCRIPTION OF THE DRAWINGS

FIG. 10 is a table illustrating conditions of ejection pulses according to models 1 to 3.

FIG. 14 is a table illustrating results of simulations of the behaviors of a plurality of ink droplets ejected when driving signals according to Examples 1 to 6 and Comparative Examples 1 and 2 are supplied.

FIG. 15 is a table illustrating results of simulations of the behaviors of a plurality of ink droplets ejected when driving signals according to Examples 7 to 15 are supplied.

DESCRIPTION OF EXEMPLARY EMBODIMENTS

Hereinafter, an embodiment of the present disclosure will be described with reference to the drawings. In each of the drawings, however, dimensions and a scale of each section are appropriately different from the actual ones. In addition, since the embodiment described below is a preferable specific example of the present disclosure, various technically preferable limitations are given. However, the scope of the present disclosure is not limited to the embodiment unless there is a description to particularly limit the present disclosure in the following description.

Figure 1:
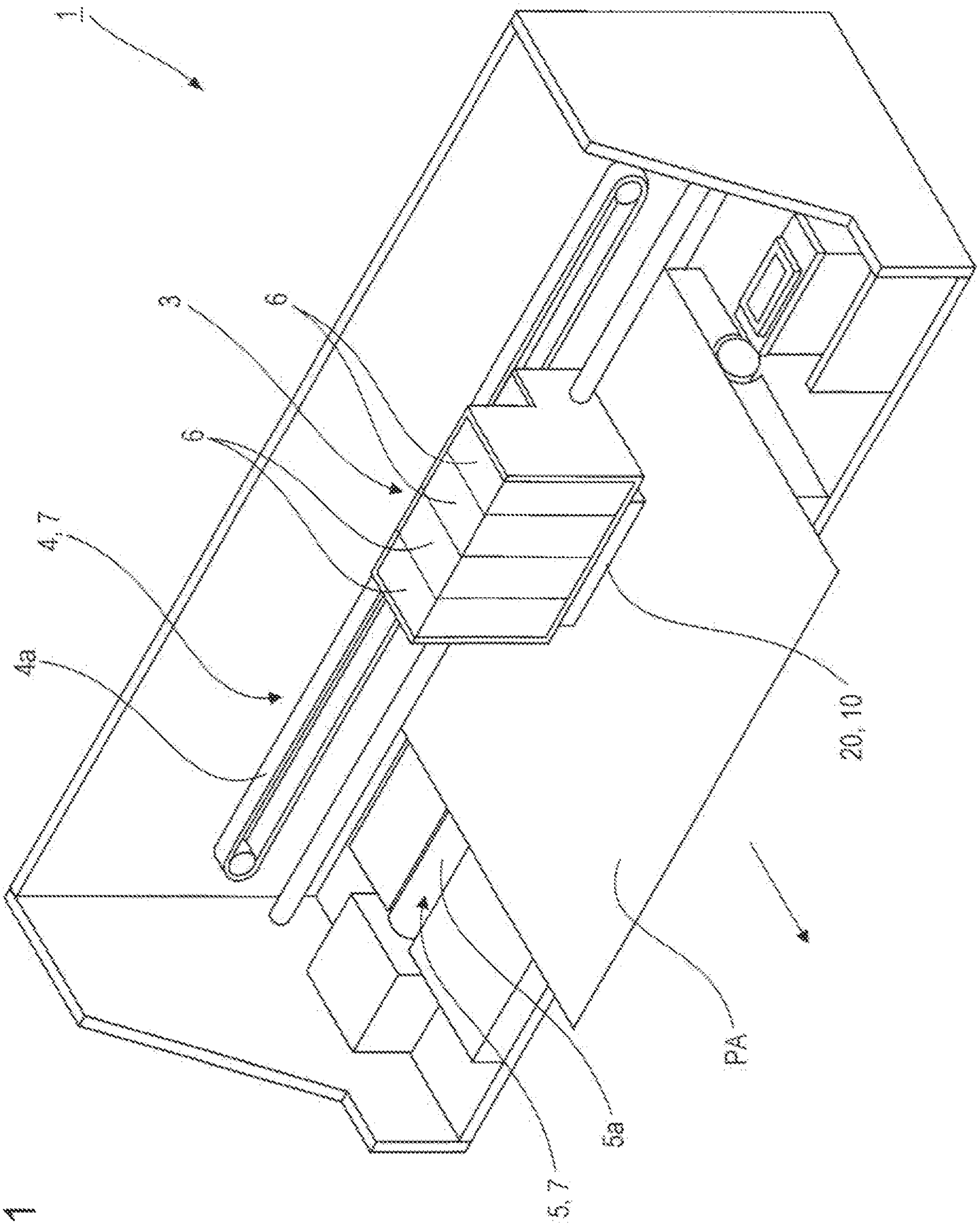
FIG. 1 is a schematic diagram of a liquid ejecting apparatus according to an embodiment.
Figure 2:
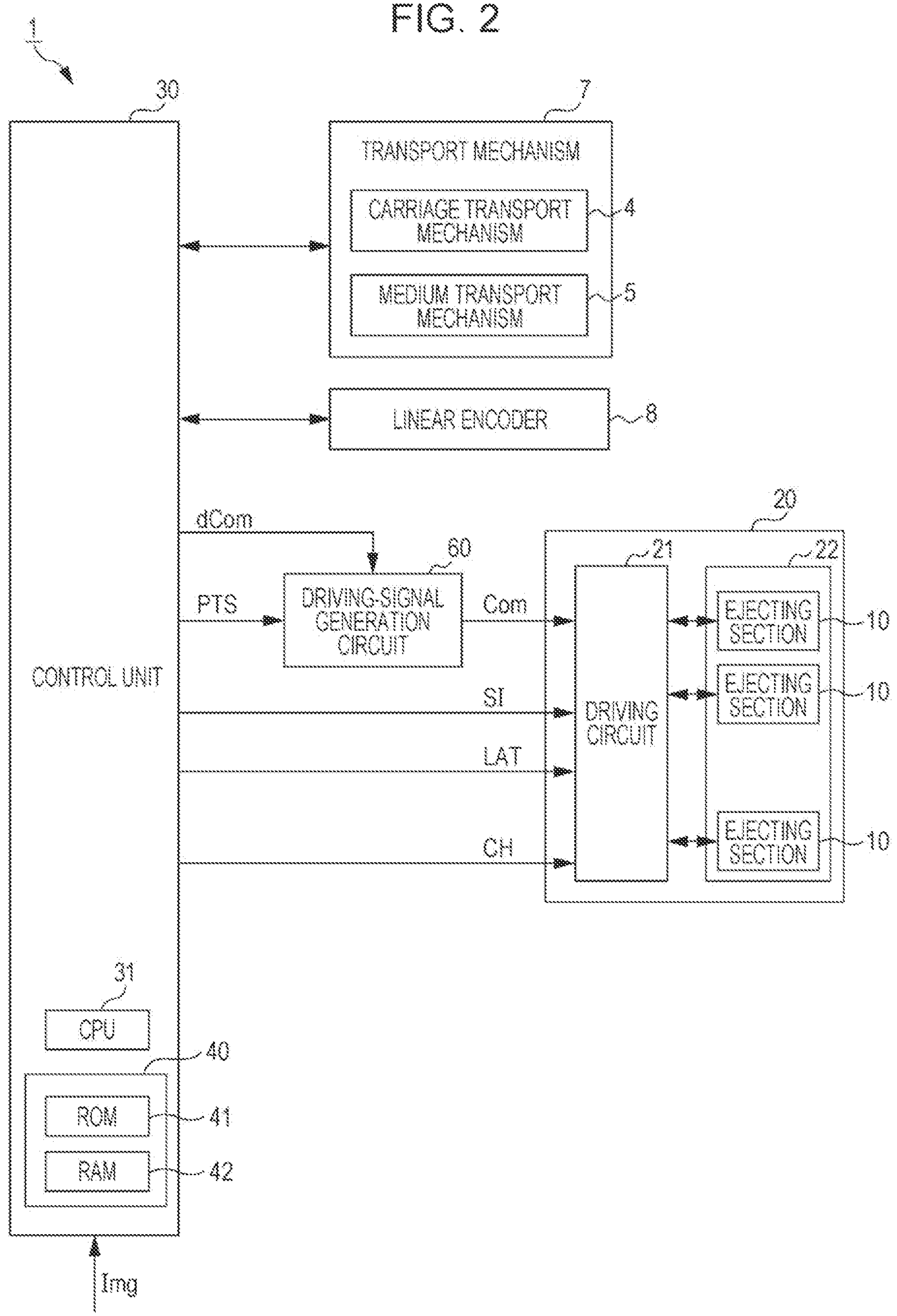
FIG. 2 is a block diagram illustrating the liquid ejecting apparatus.

FIG. 1 is a schematic perspective view illustrating an internal configuration of a liquid ejecting apparatus 1 according to an embodiment. FIG. 2 is a block diagram illustrating the liquid ejecting apparatus 1. The liquid ejecting apparatus 1 illustrated in FIG. 1 ejects ink droplets from ejecting sections 10 to land the ink droplets on a medium PA. The medium PA is, for example, printing paper. The liquid ejecting apparatus 1 includes a liquid ejecting section 20 that includes the ejecting sections 10, a carriage 3 on which the liquid ejecting section 20 is mounted, a carriage transport mechanism 4 that transports the carriage 3, and a medium transport mechanism 5 that transports a medium PA.

Ink cartridges 6 that store inks are mounted on the carriage 3. The ink cartridges 6 are ink containers that store inks. A plurality of ink cartridges corresponding to, for example, four colored inks is mounted on the carriage 3. The four colored inks include, for example, cyan, magenta, yellow, and black. The ink containers may not be mounted on the carriage 3. The inks stored in the ink cartridges 6 are supplied to the liquid ejecting section 20.

The liquid ejecting apparatus 1 includes a transport mechanism 7. The transport mechanism 7 includes the carriage transport mechanism 4 and the medium transport mechanism 5. The carriage transport mechanism 4 includes a transport belt 4*a* and a motor for transporting the carriage 3. The medium transport mechanism 5 includes a transport roller 5*a* and a motor for transporting a medium PA. The liquid ejecting apparatus 1 makes the carriage transport mechanism 4 transport the carriage 3 while making the medium transport mechanism 5 transport a medium PA, and ejects ink droplets onto the medium PA to perform printing. The liquid ejecting apparatus 1 forms dots corresponding to printing data Img on the medium PA.

The liquid ejecting apparatus 1 includes a linear encoder 8. The linear encoder 8 is provided at a position where the linear encoder 8 can detect the position of the carriage 3. The linear encoder 8 acquires information on the position of the carriage 3. With a movement of the carriage 3, the linear encoder 8 outputs an encoder signal to a control unit 30.

Figure 3:
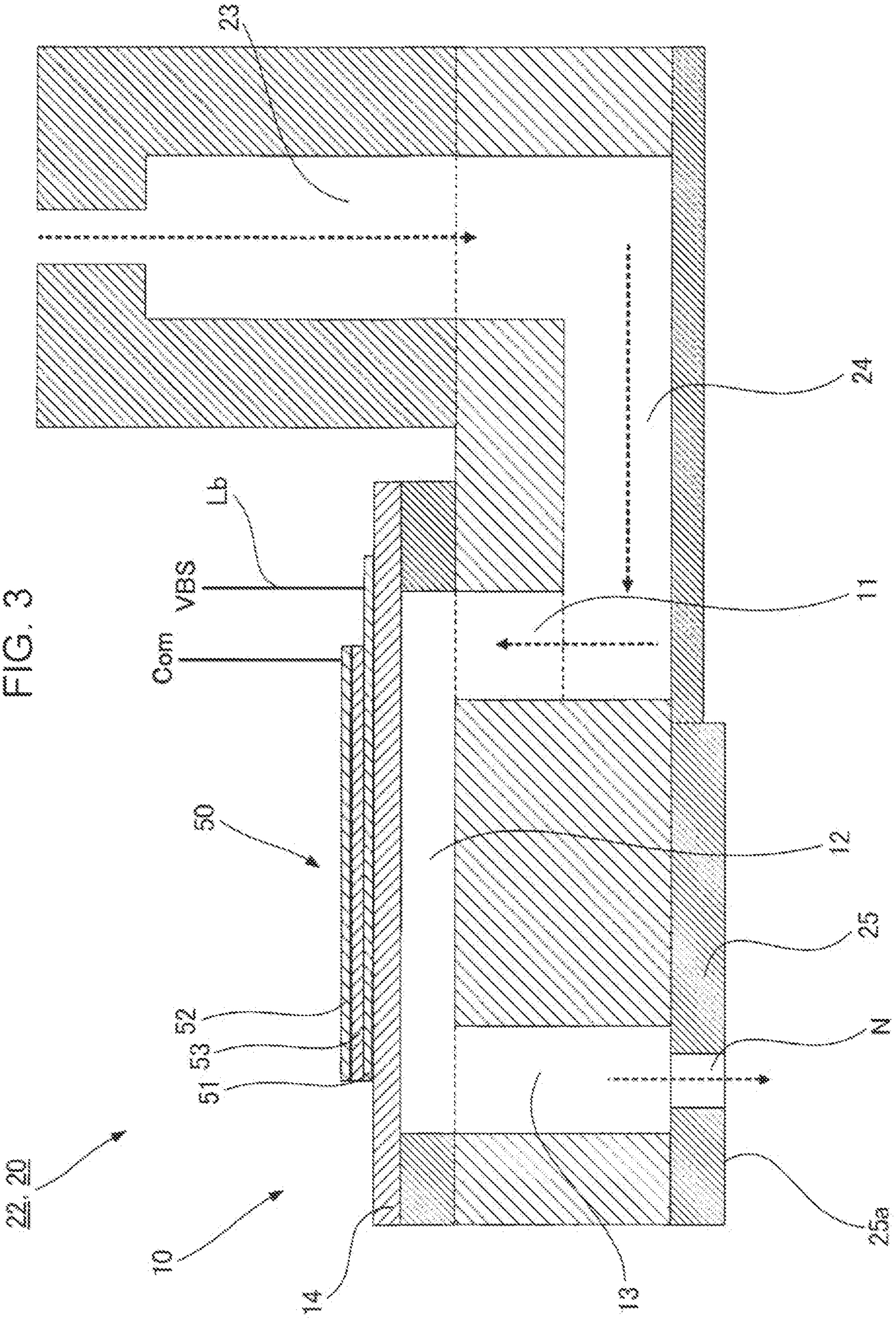
FIG. 3 is a sectional view illustrating an ejecting section.

The liquid ejecting section 20 includes a plurality of recording heads 22. FIG. 3 is a sectional view illustrating the ejecting section 10 of the recording head 22. The recording head 22 includes the plurality of ejecting sections 10 and common liquid chambers 23 and 24. The ejecting section 10 includes an individual flow path 11, a pressure chamber 12, a communicating flow path 13, and a nozzle N. The liquid ejecting section 20 includes a nozzle plate 25 at which a plurality of the nozzles N is formed. A bottom surface of the nozzle plate 25 is a nozzle surface 25*a*. The ejecting section 10 includes a vibration plate 14 and a driving element 50.

The common liquid chambers 23 and 24 communicate with the plurality of pressure chambers 12. The common liquid chambers 23 and 24 store an ink before the ink is supplied to the pressure chambers 12. The common liquid chamber 24 is coupled to and is downstream from the common liquid chamber 23. The individual flow paths 11 communicate with the common liquid chamber 24 and the pressure chambers 12. The individual flow paths 11 are provided for the pressure chambers 12. The communicating flow paths 13 communicate with the pressure chambers 12 and the nozzles N.

The vibration plate 14 constitutes part of wall surfaces of the pressure chambers 12. The vibration plate 14 is provided for the plurality of pressure chambers 12 in common. The driving element 50 is provided for each of the plurality of pressure chambers 12. The driving elements 50 include an electrode 51, electrodes 52, and a piezoelectric layer 53. The electrode 51 is a lower electrode. The electrodes 52 are upper electrodes. The electrode 51 is a common electrode. The electrodes 52 are individual electrodes. The common electrode is an electrode common to the plurality of driving elements 50. The individual electrode is provided for each of the plurality of driving elements 50. The electrode 51 may be individual electrodes, and the electrodes 52 may be a common electrode. The piezoelectric layer 53 is disposed between the electrode 51 and the electrodes 52.

The electrode 51 is electrically coupled to a power supply line Lb. The power supply line Lb is set to a potential VBS. A driving signal Com is supplied to the electrode 52. When a driving signal Com is supplied to apply a voltage between the electrode 51 and the electrode 52, the driving element 50 is displaced in a thickness direction according to the applied voltage. As a result, the driving element 50 and the vibration plate 14 vibrate. Since the vibration plate 14 vibrates, the volume of the pressure chamber 12 and the pressure in the pressure chamber 12 vary, and an ink with which the pressure chamber 12 is filled flows into the communicating flow path 13. The ink in the communicating flow path 13 is pushed out to the nozzle N, and an ink droplet is ejected from the nozzle N.

As illustrated in FIG. 2, the liquid ejecting apparatus 1 includes the control unit 30. The control unit 30 includes one or more CPUs 31. The control unit 30 may include an FPGA instead of the CPU 31 or in addition to the CPU 31. The control unit 30 includes a storage unit 40. The storage unit 40 includes, for example, RAM 42 and ROM 41. The storage unit 40 may include EEPROM or PROM. The storage unit 40 may store printing data Img supplied from a host computer. The storage unit 40 stores programs for controlling the liquid ejecting apparatus 1.

The CPU is an abbreviation for a central processing unit. The FPGA is an abbreviation for a field-programmable gate array. The RAM is an abbreviation for random-access memory. The ROM is an abbreviation for read-only memory. The EEPROM is an abbreviation for electrically erasable programmable read-only memory. The PROM is an abbreviation for programmable ROM.

The control unit 30 generates signals for controlling operation of each section of the liquid ejecting apparatus 1. The control unit 30 generates a printing signal SI and a waveform specifying signal dCom. The printing signal SI is a digital signal for specifying the type of operation of the ejecting section 10. The printing signal SI specifies whether or not to supply a driving signal Com to the ejecting section 10. The waveform specifying signal dCom is a digital signal that defines a waveform of the driving signal Com. The driving signal Com is an analog signal for driving the ejecting section 10.

The liquid ejecting apparatus 1 includes a driving-signal generation circuit 60. The driving-signal generation circuit 60 is an example of a driving-signal generation unit. The driving-signal generation circuit 60 is electrically coupled to the control unit 30. The driving-signal generation circuit 60 includes a digital-to-analog (DA) conversion circuit. The driving-signal generation circuit 60 generates a driving signal Com having a waveform defined by a waveform specifying signal dCom. When the control unit 30 receives an encoder signal from the linear encoder 8, the control unit 30 outputs a timing signal PTS to the driving-signal generation circuit 60. The timing signal PTS defines a generation timing of a driving signal Com. Each time the driving-signal generation circuit 60 receives a timing signal PTS, the driving-signal generation circuit 60 outputs a driving signal Com.

The liquid ejecting section 20 includes a driving circuit 21. The driving circuit 21 is electrically coupled to the control unit 30 and the driving-signal generation circuit 60. Based on the printing signal SI, the driving circuit 21 switches whether or not to supply the driving signal Com to the ejecting section 10. Based on the printing signal SI, a latch signal LAT, and a change signal CH supplied from the control unit 30, the driving circuit 21 selects the driving element 50 of the ejecting section 10 to which the driving signal Com is supplied. The latch signal LAT defines a latch timing of printing data Img. The change signal CH defines a selection timing of driving pulses included in the driving signal Com.

Figure 4:
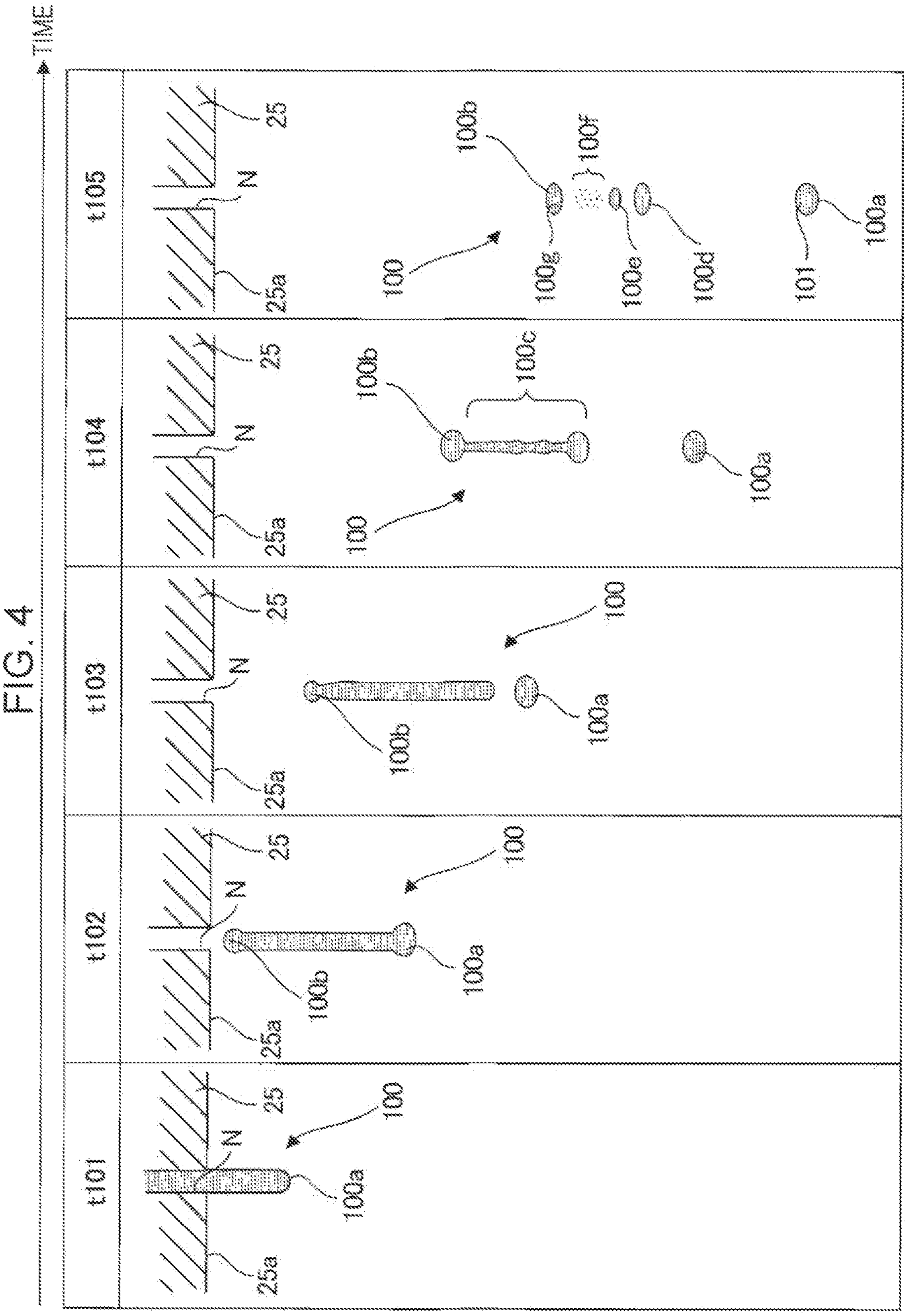
FIG. 4 is a diagram illustrating a behavior of an ink droplet according to the related art.

Next, a behavior of an ink droplet according to the related art will be described with reference to FIG. 4. FIG. 4 is a diagram illustrating a behavior of an ink droplet according to the related art. FIG. 4 illustrates states of an ink droplet 100 from time t101 to time t105 in accordance with progress of time. At time t101, the ink droplet 100 is being ejected from the nozzle N. The ink droplet 100 pushed out from the nozzle N forms a liquid column. At time t101, a leading end 100*a* of the ink droplet 100 has been ejected from the nozzle N, and a trailing end of the ink droplet 100 has not yet been ejected from the nozzle N.

At time t102, a trailing end 100*b* of the ink droplet 100 is ejected from the nozzle N. A portion of the ink droplet 100 corresponding to the trailing end 100*b* is pulled toward the nozzle N by surface tension between an ink remaining in the nozzle N and the trailing end 100*b* of the ink droplet 100. When the speed of the trailing end 100*b* reaches 0 m/s from the state of being pulled by the ink remaining in the nozzle N, the ink remaining in the nozzle N and the trailing end 100*b* of the ink droplet 100 ejected from the nozzle N are separated from each other. The trailing end 100*b* is torn off from the ink remaining in the nozzle N, and the trailing end 100*b* is ejected from the nozzle N. In this state, the leading end 100*a* has a larger volume than the volume of the trailing end 100*b*.

There is a speed difference between the speed Va of the leading end 100*a* and the speed Vb of the trailing end 100*b* of the ink droplet 100. The speed Va of the leading end 100*a* is faster than the speed Vb of the trailing end 100*b*. In this state, the leading end 100*a* and the trailing end 100*b* are remote from each other in the traveling direction of the ink droplet 100. The ink droplet 100 forms a liquid column shape in which the leading end 100*a* and the trailing end 100*b* are remote from each other. At time t103, the leading end 100*a* is separated from a column-shaped portion.

An intermediate portion 100*c* forming the column-shape is unstable. The intermediate portion 100*c* is an intermediate portion between the leading end 100*a* and the trailing end 100*b*. At time t104, the intermediate portion 100*c* begins to separate into a plurality of droplets. Part of the separated droplets are united by surface tension. At time t105, the ink droplet 100 has been separated into a main droplet 101 including the leading end 100*a*, a plurality of satellite droplets 100*d* and 100*e*, a fine mist 100*f*, and a satellite droplet 100*g* including the trailing end 100*b*. For example, part of the fine mist 100*f* may be united by surface tension to become the satellite droplets 100*d* and 100*e*. As described above, the speed difference between the speeds of the leading end 100*a* and the trailing end 100*b* separates the ink droplet 100, and generates the fine mist 100*f*.

Figure 5:
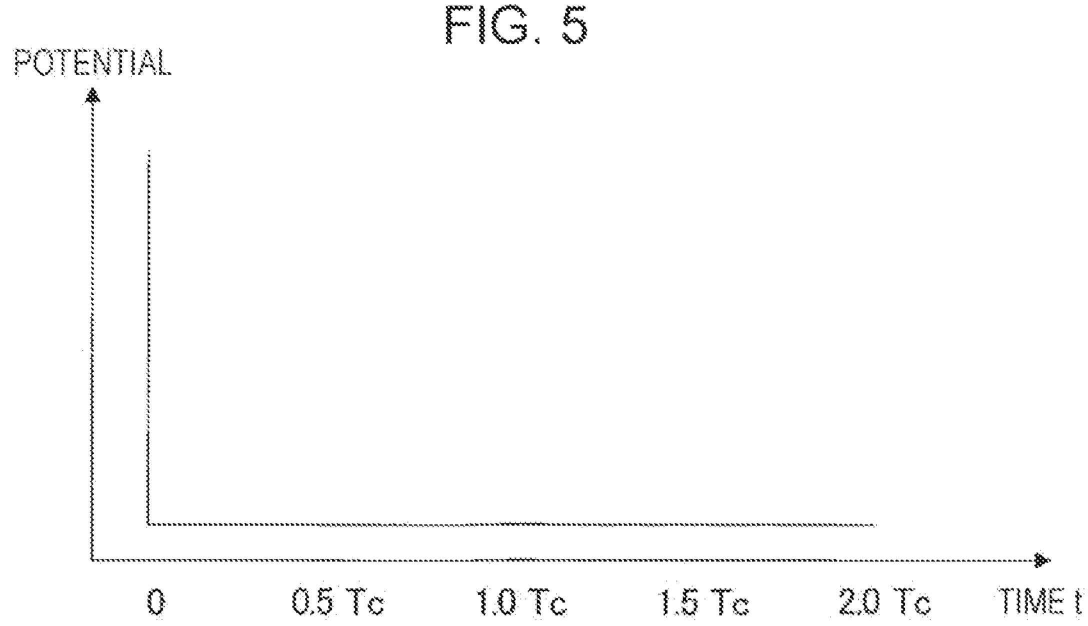
FIG. 5 is a waveform diagram illustrating a square wave for expanding the volume of a pressure chamber.
Figure 6:
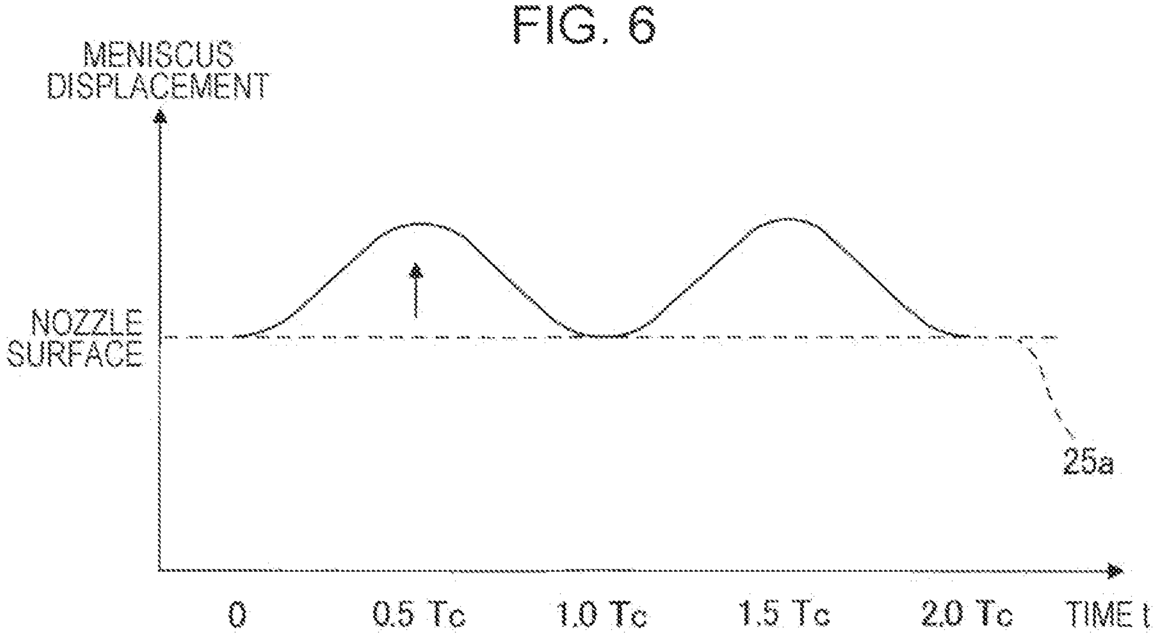
FIG. 6 is a diagram illustrating the behavior of a meniscus at a time when a signal including the square wave illustrated in FIG. 5 is applied to a driving element.

Next, the behavior of a meniscus in the nozzle N at a time when a driving signal including a square wave is supplied to the driving element 50 will be described with reference to FIGS. 5 and 6. FIG. 5 is a waveform diagram illustrating a square wave for expanding the volume of the pressure chamber 12. FIG. 6 is a diagram illustrating the behavior of a meniscus at a time when a signal including the square wave illustrated in FIG. 5 is applied to the driving element 50. In FIGS. 5 and 6, the horizontal axis represents passage of time. The passage of time is illustrated with the natural-vibration cycle Tc of the ejecting section 10 as the criterion. In FIG. 5, the vertical axis represents potential. In FIG. 6, the vertical axis represents the position of a meniscus in the nozzle N. In FIG. 6, the upper side indicates the inner side of the nozzle N, and the lower side indicates the outer side of the nozzle N.

The natural-vibration cycle Tc of the ejecting section 10 may be measured through an experiment or may be calculated through a simulation. The natural-vibration cycle Tc may be a natural-vibration cycle of vibration of an ink in the pressure chamber 12.

The natural-vibration cycle Tc may be calculated using, for example, the following Formula (1). In Formula (1), Mn is the mass [kg/m] of an ink per unit length in the nozzle N. The direction of the unit length is along, for example, the vibration direction of the ink. Ms is the mass [kg/m] of the ink per unit length in the individual flow path 11 that supplies the ink to the pressure chamber 12. Cc is the volume variation [$m^3$/N] of the ink per unit pressure in the pressure chamber 12.

$$Tc=2\pi[\{(Mn\times Ms)/(Mn+Ms)\}\times Cc]^{1/2} \quad (1)$$

At time t=0, a meniscus is present at the nozzle surface 25*a*. At time t=0, a signal including a square wave is applied to the driving element 50. As a result, the volume of the pressure chamber 12 expands. When the volume of the pressure chamber 12 expands, an ink in the nozzle N is drawn into the inside of the nozzle N. The inside of the nozzle N is a side close to the pressure chamber 12. The meniscus is remote from the nozzle surface 25*a* and moves closer to the pressure chamber 12 so that a flow of the ink is generated in the nozzle N.

At time t=0.5Tc, the displacement of the meniscus due to natural vibration of the ejecting section 10 is the largest and is farthest away from the nozzle surface 25*a*. Then the meniscus is displaced by natural vibration of the ejecting section 10 to approach the nozzle surface 25*a*.

Next, the behavior of a meniscus in the nozzle N at a time when a driving signal including a square wave is supplied to the driving element 50 will be described with reference to FIGS. 7 and 8. The same description as the above-described description of FIGS. 5 and 6 is omitted.

Figure 7:
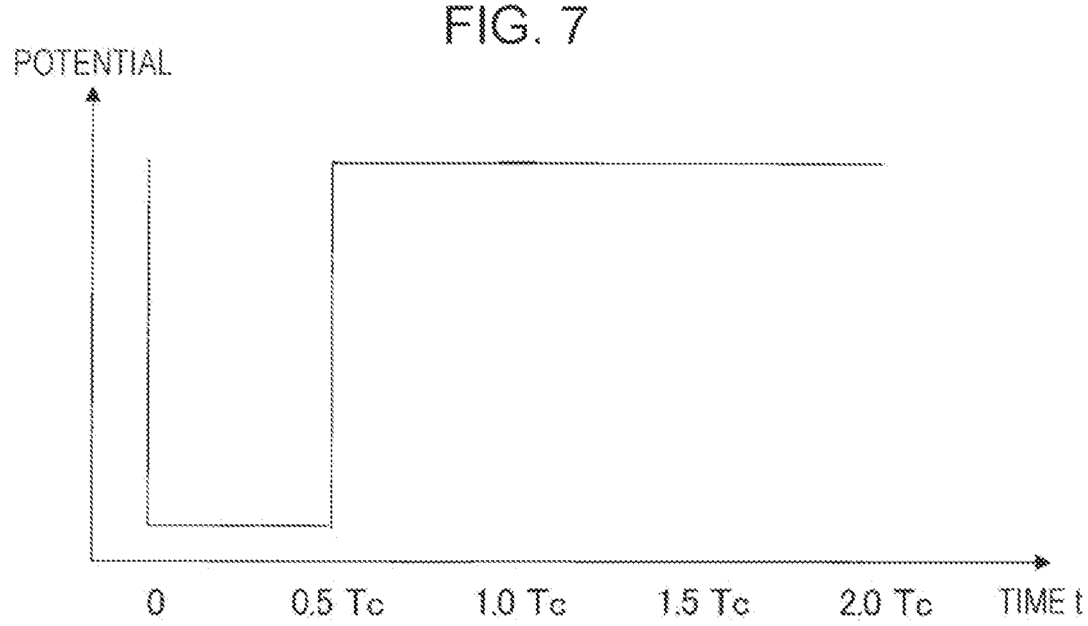
FIG. 7 is a waveform diagram illustrating a square wave for expanding and contracting the volume of a pressure chamber.
Figure 8:
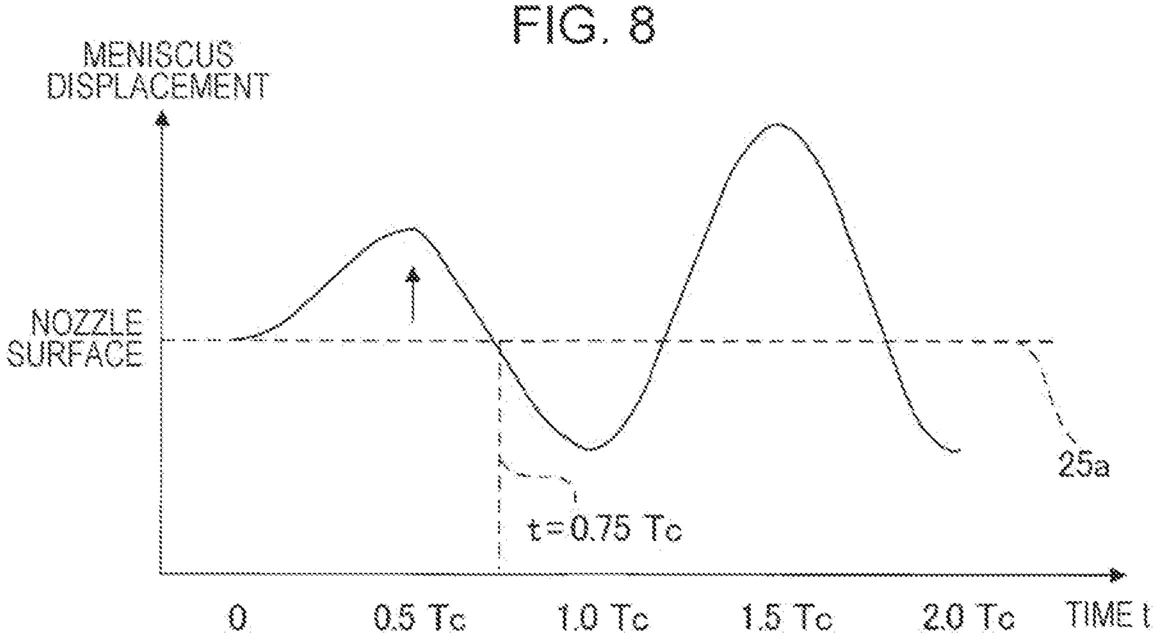
FIG. 8 is a diagram illustrating the behavior of a meniscus at a time when a signal including the square wave illustrated in FIG. 7 is applied to a driving element.

In the square wave illustrated in FIG. 7, the volume of the pressure chamber 12 is contracted at time t=0.5Tc at which the phase of vibration of the meniscus due to natural vibration of the ejecting section 10 is reversed. As a result, an ejection force is applied to the ink, the meniscus vibration due to natural vibration of the ejecting section 10 resonates, and the amplitude is doubled so that an ink droplet is efficiently ejected from the nozzle N. At time t=0.75Tc, the ink is ejected from the nozzle surface 25*a*. Then, since the speed Vb of a trailing end 100*b* of an ink droplet 100 monotonously decreases until time t=1.0Tc at which a flow of the ink in the nozzle N is reversed again, a speed difference between the speeds of a leading end 100*a* and the trailing end 100*b* of the ink droplet 100 occurs, and the ink droplet 100 forms a liquid column. From the leading end 100*a* to the trailing end 100*b* of the ink droplet 100, a speed difference is generated, and a speed gradient is formed.

Considering such a speed difference between the speeds of the leading end 100*a* and the trailing end 100*b* of the ink droplet 100, an ejection force is applied to the ink in the nozzle N at a timing of time t=1.0Tc to eject a droplet in such a manner that the speed difference between the speeds of the leading end 100*a* and the trailing end 100*b* of the ink droplet 100 is restricted, and the formation of the liquid column is restricted. In this case, the absolute value of the speed Va of the leading end 100*a* also decreases. However, a displacement amount of the vibration plate 14 is compensated to increase the speed Va.

Figure 9:
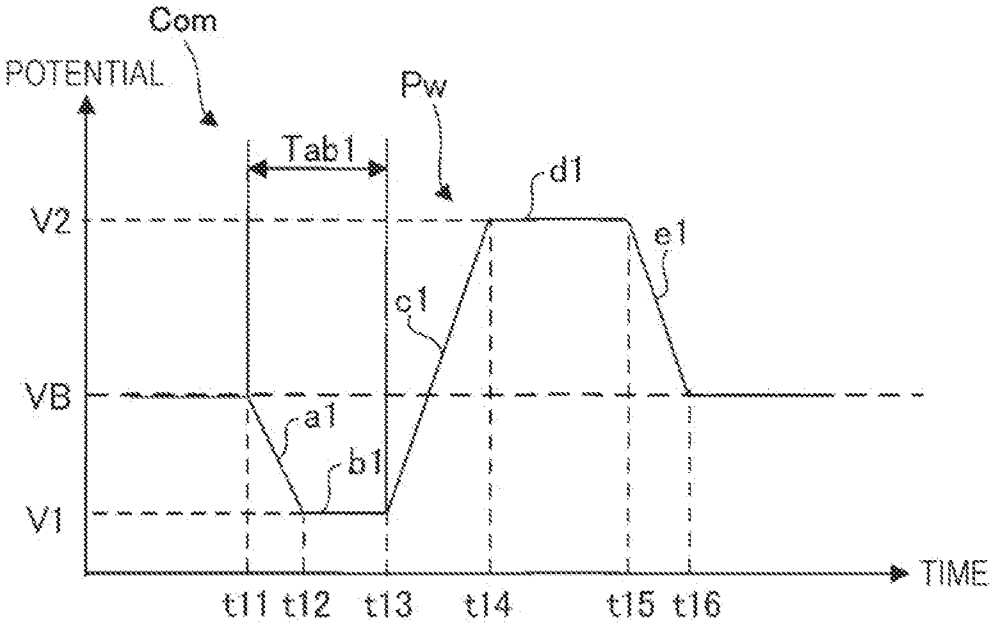
FIG. 9 is a waveform diagram illustrating a driving signal including an ejection pulse.
Figure 11:
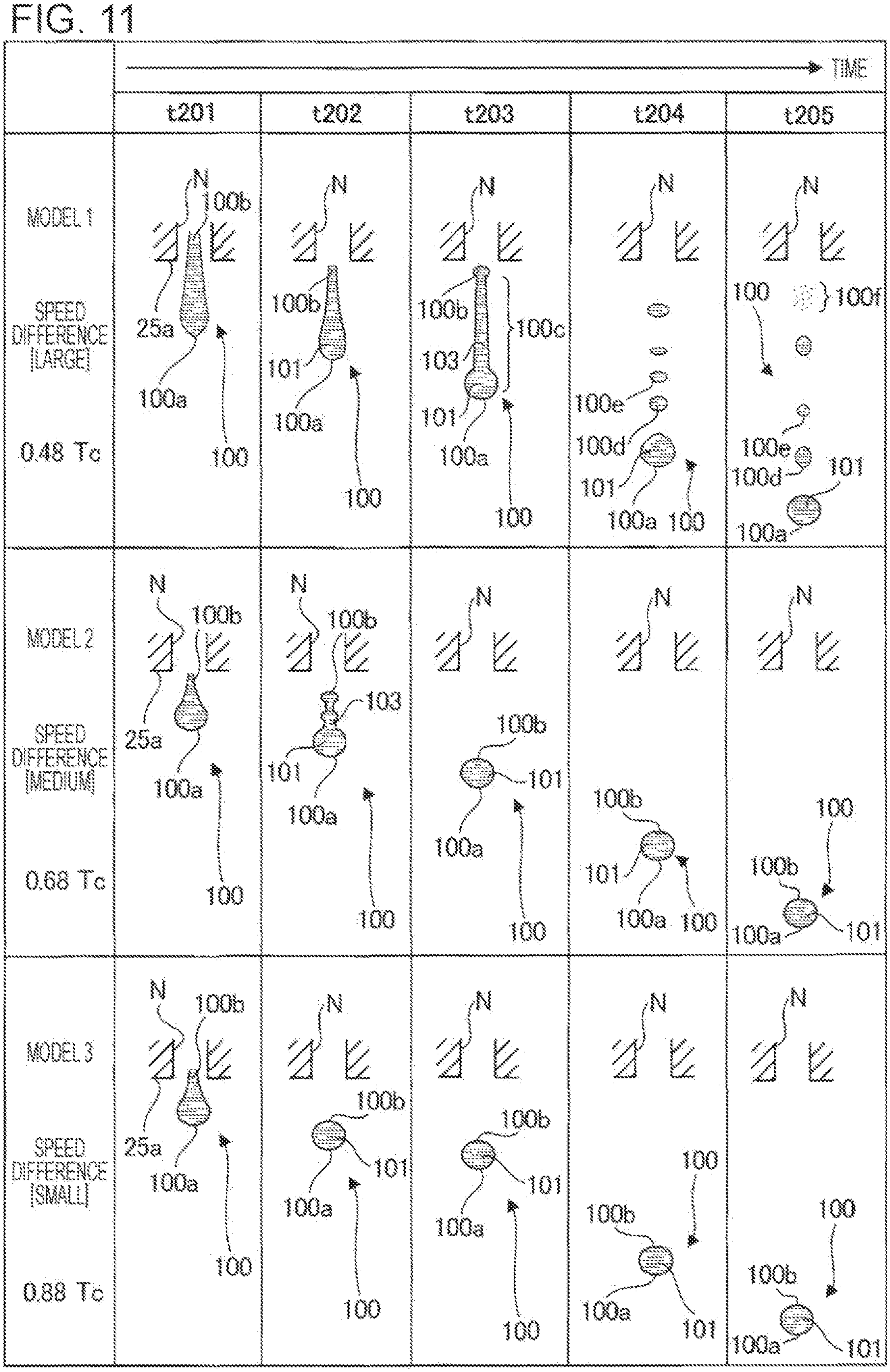
FIG. 11 is a diagram illustrating behaviors of ink droplets due to ejection pulses according to the models 1 to 3.

Next, reference examples of a behavior of an ink droplet ejected from the nozzle N will be described with reference to FIGS. 9 to 11. Results of simulations in which behaviors of ink droplets according to models 1 to 3 were verified will be described. The ink droplets according to the models 1 to 3 differ in the speed difference between the speeds of a leading end and a trailing end of the ink droplet. FIG. 9 is a waveform diagram illustrating a waveform of an ejection pulse Pw of a driving signal Com. FIG. 10 is a table illustrating conditions of ejection pulses Pw according to the models 1 to 3. FIG. 11 is a diagram illustrating behaviors of ink droplets 100 due to ejection pulses Pw according to the models 1 to 3. The driving signal Com illustrated in FIG. 9 is supplied to the driving element 50 to eject an ink droplet 100 from the nozzle N. When a condition of the ejection pulses Pw is varied as illustrated in FIG. 10, behaviors of the ink droplets 100 are different as illustrated in FIG. 11.

The ejection pulse Pw illustrated in FIG. 9 includes an expansion element a1, an expansion-maintaining element b1, a contraction element c1, a contraction-maintaining element d1, and a vibration-damping element e1. The expansion element a1 is an element that expands the volume of the pressure chamber 12. The expansion-maintaining element b2 is an element that maintains the volume of the pressure chamber 12 expanded by the expansion element a1. The contraction element c1 is an element that contracts the volume of the pressure chamber 12 maintained by the expansion-maintaining element b2. The contraction-maintaining element d1 is an element that maintains the volume of the pressure chamber 12 contracted by the contraction element c1. The vibration-damping element e1 is an element that expands the volume of the pressure chamber 12 maintained by the contraction-maintaining element d1, to reduce residual vibration of an ink in the pressure chamber 12.

The ejection pulse Pw has a potential that varies from a potential V1 to a potential V2. The expansion element a1 starts from a reference potential VB. The reference potential VB is a potential between the potential V1 and the potential V2. The expansion element a1 starts from the reference potential VB at time t11 and reaches the potential V1 at time t12.

The expansion-maintaining element b1 is maintained at the potential V1. The expansion-maintaining element b1 is maintained at the potential V1 from time t12 to time t13. The contraction element c1 has a potential that varies from the potential V1 to the potential V2. The contraction element c1 starts from the potential V1 at time t13 and reaches the potential V2 at time t14.

The contraction-maintaining element d1 is maintained at the potential V2. The contraction-maintaining element d1 is maintained at the potential V2 from time t14 to time t15. The vibration-damping element e1 has a potential that varies from the potential V2 to the reference potential VB. Note that a period Tab1 illustrated in FIG. 9 is the length of the sum of the expansion element a1 and the expansion-maintaining element b1. The length of the period Tab1 is varied to vary the speed of a trailing end 100*b* of an ink droplet 100 ejected from the nozzle N.

As illustrated in FIG. 10, the ejection pulses Pw according to the models 1 to 3 were set so that the models 1 to 3 differed in the speed difference between the speeds of a leading end 100*a* and a trailing end 100*b* of an ink droplet 100. For the ejection pulses Pw according to the models 1 to 3, the time length of the expansion element a1 from time t11 to time t12 is the same, and the time length of the contraction element c1 from time t13 to time t14 is the same. Further, the potential difference between the potential V1 and the potential V2 was adjusted so that the speed Vm1 of the leading end 100*a* of the ink droplet 100 is the same for all the models 1 to 3. The ejection pulses Pw according to the models 1 to 3 differ in the time length of the expansion-maintaining element b1 from time t12 to time t13, and thus differ in the time length of the period Tab1 from time t11 to time t13. Further, the ejection pulses Pw according to the models 1 to 3 differ in the speed difference Vd between the speeds of the leading end 100*a* and the trailing end 100*b* of the ink droplet 100.

In the model 1, the time length of the expansion element a1 is 1.6 [μs], and the time length of the expansion-maintaining element b1 is 2.2 [μs]. In the model 1, the length of the period Tab1 is 0.48 multiplied by the natural-vibration cycle Tc. In the model 1, the time length of the contraction element c1 is 2.75 [μs], and the speed Vm1 of the leading end 100*a* of the ink droplet 100 is 8.5 [m/s]. In the model 1, the speed difference Vd between the speeds of the leading end 100*a* and the trailing end 100*b* of the ink droplet 100 is "large".

In the model 2, the time length of the expansion-maintaining element b1 is 3.8 [μs], and the time length of the period Tab1 is 0.68 multiplied by the natural-vibration cycle Tc. In the model 2, the speed difference Vd between the speeds of the leading end 100*a* and the trailing end 100*b* of the ink droplet 100 is "medium". In the model 3, the time length of the expansion-maintaining element b1 is 5.4 [μs], and the time length of the period Tab1 is 0.88 multiplied by the natural-vibration cycle Tc. In the model 3, the speed difference Vd between the speeds of the leading end 100*a* and the trailing end 100*b* of the ink droplet 100 is "small". The speed difference Vd in the model 1 is larger than the speed difference Vd in the model 2. The speed difference Vd in the model 2 is larger than the speed difference Vd in the model 3.

In FIG. 11, states of the ink droplets 100 ejected from the nozzle N are illustrated for respective times. In the model 1, at time t201, the leading end 100*a* of the ink droplet 100 is ejected from the nozzle N. At time t202, the trailing end 100*b* of the ink droplet 100 is ejected from the nozzle N. At time t203, an intermediate portion 100*c* having a liquid column shape is generated by the speed difference between the speeds of the leading end 100*a* and the trailing end 100*b* of the ink droplet 100. At time t204, the intermediate portion 100*c* splits into satellite droplets 100*d* and 100*e*. At time t205, part of the ink droplet 100 becomes a fine mist 100*f* having little speed.

In the model 2, at time t201, the leading end 100*a* of the ink droplet 100 is ejected from the nozzle N. At time t202, the trailing end 100*b* is ejected from the nozzle N. At times from t203 to t205, the leading end 100*a* and the trailing end 100*b* form one main droplet 101.

In the model 3, at time t201, the leading end 100*a* of the ink droplet 100 is ejected from the nozzle N. At time t202, the trailing end 100*b* is ejected from the nozzle N. In the model 3, almost no liquid column was generated. At times from t203 to t205, the leading end 100*a* and the trailing end 100*b* form one main droplet 101.

As described above, in the model 1, the fine mist 100*f* was formed. In the models 2 and 3, however, no mist 100*f* was formed. In the models 2 and 3, only the main droplet 101 flies.

Figure 12:
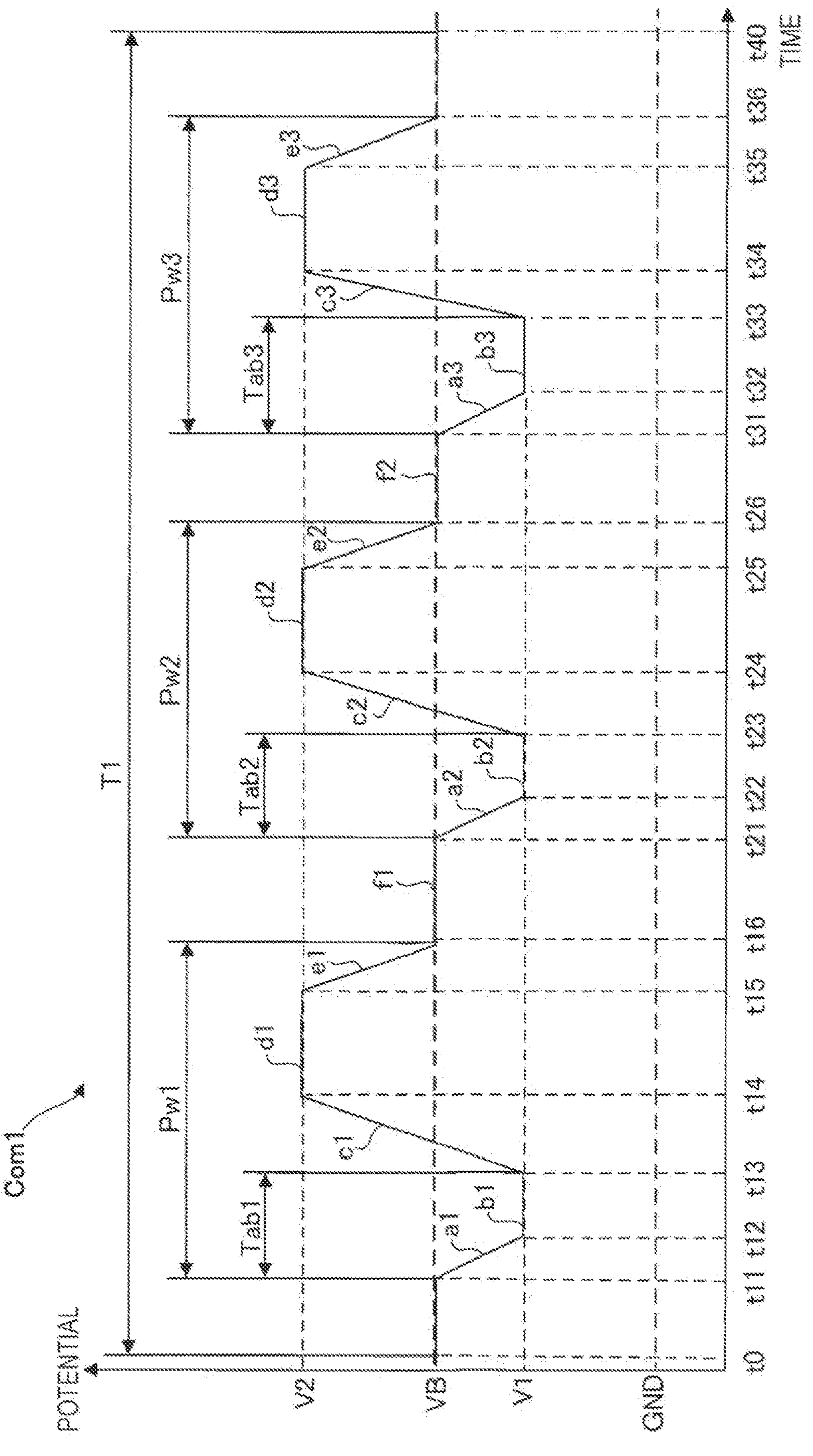
FIG. 12 is a waveform diagram illustrating a waveform of a driving signal according to the embodiment.

Next, FIG. 12 is a waveform diagram illustrating a waveform of a driving signal Com1 according to the embodiment. In FIG. 12, the horizontal axis represents passage of time, and the vertical axis represents potential. A driving waveform included in the driving signal Com1 includes a plurality of ejection pulses Pw1, Pw2, and Pw3 during one cycle T1. The ejection pulse Pw1 is an example of a preceding ejection pulse. The ejection pulse Pw3 is an example of a final ejection pulse. The ejection pulse Pw2 is supplied to the driving element 50 after the ejection pulse Pw1. The ejection pulse Pw3 is supplied to the driving element 50 after the ejection pulse Pw2. The one cycle T1 may be, for example, a length from reception of a timing signal PTS to reception of the next timing signal PTS. The one cycle T1 may be, for example, a length from reception of a latch signal LAT to reception of the next latch signal LAT.

The ejection pulse Pw1 includes an expansion element a1, an expansion-maintaining element b1, a contraction element c1, a contraction-maintaining element d1, and a vibration-damping element e1. The expansion element a1 is an element that expands the volume of the pressure chamber 12. The expansion element a1 is an example of a first expansion element. The expansion-maintaining element b2 is an element that maintains the volume of the pressure chamber 12 expanded by the expansion element a1. The expansion-maintaining element b1 is an example of a first expansion-maintaining element. The contraction element c1 is an element that contracts the volume of the pressure chamber 12 maintained by the expansion-maintaining element b2. The contraction element c1 is an example of a first contraction element. The contraction-maintaining element d1 is an element that maintains the volume of the pressure chamber 12 contracted by the contraction element c1. The vibration-damping element e1 is an element that expands the volume of the pressure chamber 12 maintained by the contraction-maintaining element d1, to reduce residual vibration of an ink in the pressure chamber 12. The vibration-damping element e1 is an example of a first vibration-damping element.

The ejection pulse Pw1 has a potential that varies from a potential V1 to a potential V2. The expansion element a1 starts from a reference potential VB. The reference potential VB is a potential between the potential V1 and the potential V2. The expansion element a1 starts from the reference potential VB at time t11 and reaches the potential V1 at time t12.

The expansion-maintaining element b1 is maintained at the potential V1. The expansion-maintaining element b1 is maintained at the potential V1 from time t12 to time t13. The contraction element c1 has a potential that varies from the potential V1 to the potential V2. The contraction element c1 starts from the potential V1 at time t13 and reaches the potential V2 at time t14.

The contraction-maintaining element d1 is maintained at the potential V2. The contraction-maintaining element d1 is maintained at the potential V2 from time t14 to time t15. The vibration-damping element e1 has a potential that varies from the potential V2 to the reference potential VB. The vibration-damping element e1 starts from the potential V2 at time t15 and reaches the reference potential VB at time t16.

The driving waveform includes a coupling element f1 that couples the ejection pulse Pw1 to the ejection pulse Pw2. The coupling element f1 is maintained at the reference potential VB. The coupling element f1 is maintained at the reference potential VB from time t16 to time t21.

A period Tab1 of the sum of the expansion element a1 and the expansion-maintaining element b1 of the ejection pulse Pw1 is longer than the length that is 0.5 multiplied by the natural-vibration cycle Tc of the ejecting section 10. The period Tab1 of the sum of the expansion element a1 and the expansion-maintaining element b1 of the ejection pulse Pw1 is shorter than a length that is 1.0 multiplied by the natural-vibration cycle Tc of the ejecting section 10. The period Tab1 of the sum of the expansion element a1 and the expansion-maintaining element b1 of the ejection pulse Pw1 is an example of a time width of the sum of the first expansion element and the first expansion-maintaining element of the preceding ejection pulse. The period Tab1 is the length from time t11 to time t13.

The ejection pulse Pw2 includes an expansion element a2, an expansion-maintaining element b2, a contraction element c2, a contraction-maintaining element d2, and a vibration-damping element e2. The relationship between the expansion element a2, the expansion-maintaining element b2, the contraction element c2, the contraction-maintaining element d2, and the vibration-damping element e2, and the expansion and contraction of the volume of the pressure chamber 12 is similar to the relationship between the expansion element a1, the expansion-maintaining element b1, the contraction element c1, the contraction-maintaining element d1, and the vibration-damping element e1 of the ejection pulse Pw1, and the expansion and contraction of the volume of the pressure chamber 12.

The ejection pulse Pw2 has a potential that varies from the potential V1 to the potential V2. The expansion element a2 starts from the reference potential VB. The reference potential VB is a potential between the potential V1 and the potential V2. The expansion element a2 starts from the reference potential VB at time t21 and reaches the potential V1 at time t22.

The expansion-maintaining element b2 is maintained at the potential V1. The expansion-maintaining element b2 is maintained at the potential V1 from time t22 to time t23. The contraction element c2 has a potential that varies from the potential V1 to the potential V2. The contraction element c2 starts from the potential V1 at time t23 and reaches the potential V2 at time t24.

The contraction-maintaining element d2 is maintained at the potential V2. The contraction-maintaining element d2 is maintained at the potential V2 from time t24 to time t25. The vibration-damping element e2 has a potential that varies from the potential V2 to the reference potential VB. The vibration-damping element e2 starts from the potential V2 at time t25 and reaches the reference potential VB at time t26.

The driving waveform includes a coupling element f2 that couples the ejection pulse Pw2 to the ejection pulse Pw3. The coupling element f2 is maintained at the reference potential VB. The coupling element f2 is maintained at the reference potential VB from time t26 to time t31.

A period Tab2 of the sum of the expansion element a2 and the expansion-maintaining element b2 of the ejection pulse Pw2 may be longer than the length that is 0.5 multiplied by the natural-vibration cycle Tc of the ejecting section 10. The period Tab2 of the sum of the expansion element a2 and the expansion-maintaining element b2 of the ejection pulse Pw2 may be shorter than the length that is 1.0 multiplied by the natural-vibration cycle Tc of the ejecting section 10. The period Tab2 of the sum of the expansion element a2 and the expansion-maintaining element b2 of the ejection pulse Pw2 is an example of a time width of the preceding ejection pulse. The period Tab2 is the length from time t21 to time t23.

The ejection pulse Pw3 includes an expansion element a3, an expansion-maintaining element b3, a contraction element c3, a contraction-maintaining element d3, and a vibration-damping element e3. The expansion element a3 is an element that expands the volume of the pressure chamber 12. The expansion element a3 is an example of a second expansion element. The expansion-maintaining element b3 is an element that maintains the volume of the pressure chamber 12 expanded by the expansion element a3. The expansion-maintaining element b3 is an example of a second expansion-maintaining element. The contraction element c3 is an element that contracts the volume of the pressure chamber 12 maintained by the expansion-maintaining element b3. The contraction element c3 is an example of a second contraction element. The contraction-maintaining element d3 is an element that maintains the volume of the pressure chamber 12 contracted by the contraction element c3. The vibration-damping element e3 is an element that expands the volume of the pressure chamber 12 maintained by the contraction-maintaining element d3, to reduce residual vibration of an ink in the pressure chamber 12. The vibration-damping element e3 is an example of a second vibration-damping element.

The ejection pulse Pw3 has a potential that varies from the potential V1 to the potential V2. The expansion element a3 starts from the reference potential VB. The reference potential VB is a potential between the potential V1 and the potential V2. The expansion element a3 starts from the reference potential VB at time t31 and reaches the potential V1 at time t32.

The expansion-maintaining element b3 is maintained at the potential V1. The expansion-maintaining element b3 is maintained at the potential V1 from time t32 to time t33. The contraction element c3 has a potential that varies from the potential V1 to the potential V2. The contraction element c3 starts from the potential V1 at time t33 and reaches the potential V2 at time t34.

The contraction-maintaining element d3 is maintained at the potential V2. The contraction-maintaining element d3 is maintained at the potential V2 from time t34 to time t35. The vibration-damping element e3 has a potential that varies from the potential V2 to the reference potential VB. The vibration-damping element e3 starts from the potential V2 at time t35 and reaches the reference potential VB at time t36.

A period Tab3 of the sum of the expansion element a3 and the expansion-maintaining element b3 of the ejection pulse Pw3 is longer than the length that is 0.5 multiplied by the natural-vibration cycle Tc of the ejecting section 10. The period Tab3 of the sum of the expansion element a3 and the expansion-maintaining element b3 of the ejection pulse Pw3 is shorter than the length that is 1.0 multiplied by the natural-vibration cycle Tc of the ejecting section 10. The period Tab3 of the sum of the expansion element a3 and the expansion-maintaining element b3 of the ejection pulse Pw3 is an example of a time width of the sum of the second expansion element and the second expansion-maintaining element of the final ejection pulse. The period Tab3 is the length from time t31 to time t33. The period Tab3 may be the length that is 0.56 or more and 0.68 or less multiplied by the natural-vibration cycle Tc.

The period Tab1 is shorter than the period Tab3. In other words, the length from time t31 to time t33 is longer than the length from time t11 to time t13.

The potential variation amount per unit time of the contraction element c3 of the ejection pulse Pw3 is larger than the potential variation amount per unit time of the contraction element c1 of the ejection pulse Pw1. The inclination of the contraction element c3 is steeper than the inclination of the contraction element c1.

In addition, the time of the sum of the ejection pulses Pw1 to Pw3 is shortened to shorten the cycle T1 of the driving signal Com1. Consequently, the speed of printing by the liquid ejecting apparatus 1 is increased.

Figure 13:
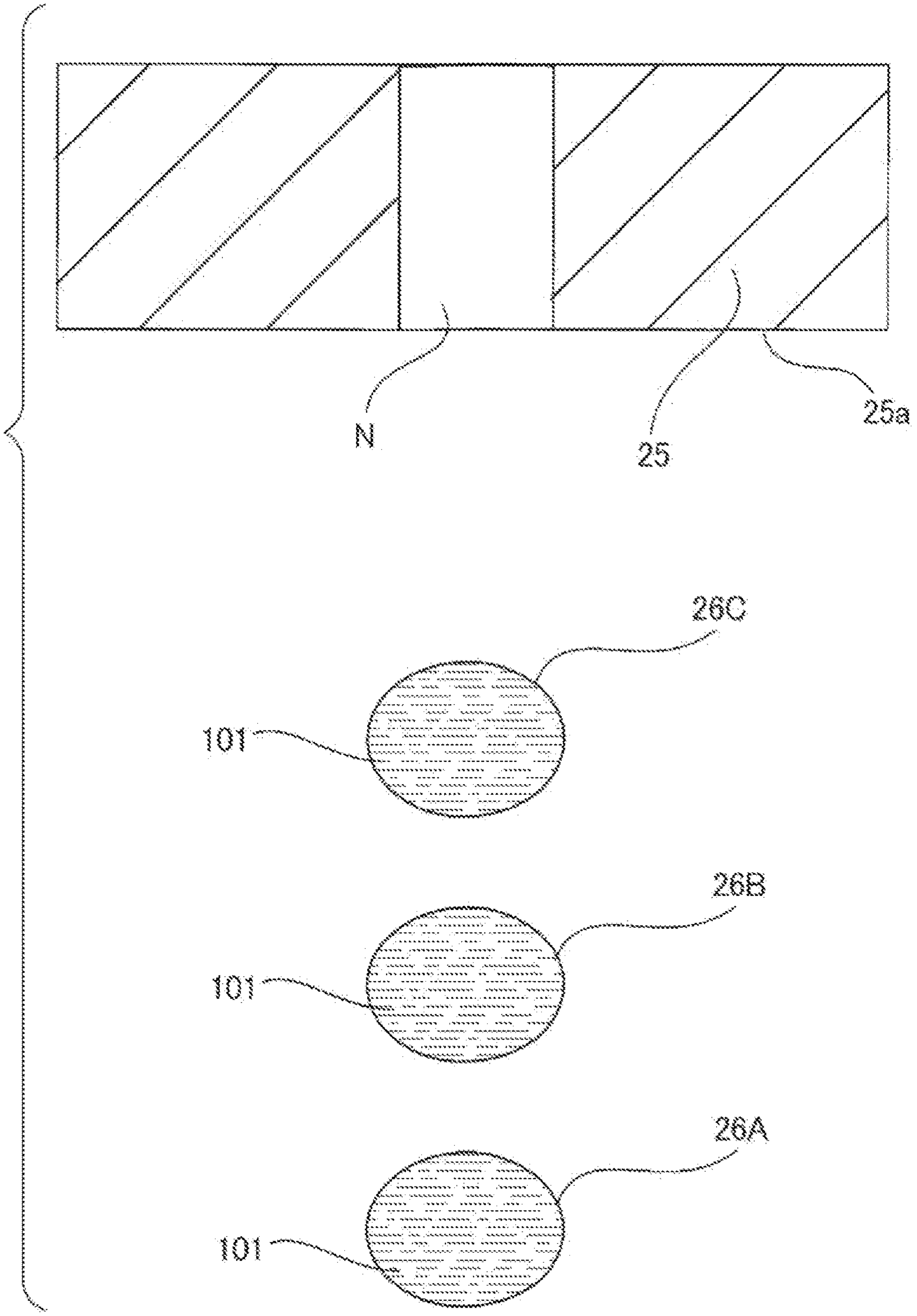
FIG. 13 is a diagram illustrating a plurality of ink droplets ejected from a nozzle.

FIG. 13 is a diagram illustrating a plurality of ink droplets 26A, 26B, and 26C ejected from the nozzle N. When a driving signal Com1 is supplied to the driving element 50, a pressure variation occurs in an ink in the pressure chamber 12, the ink in the pressure chamber 12 is pushed out, and the ink droplets 26A, 26B, and 26C are ejected from the nozzle N. An ejection pulse Pw1 is supplied to the driving element 50 to eject the ink droplet 26A. An ejection pulse Pw2 is supplied to the driving element 50 to eject the ink droplet 26B. An ejection pulse Pw3 is supplied to the driving element 50 to eject the ink droplet 26C. After the ink droplet 26A is ejected, the ink droplet 26B is ejected. After the ink droplet 26B is ejected, the ink droplet 26C is ejected. The ink droplet 26C is an example of a final droplet ejected last among the plurality of ink droplets 26A to 26C. The ink droplets 26A and 26B are an example of a preceding droplet, among the plurality of ink droplets 26A to 26C, ejected before the final droplet.

The ink droplet 26C ejected later has a speed Vm3 faster than the speed Vm1 of the preceding ink droplet 26A. The speed Vm3 of the ink droplet 26C ejected later is faster than the speed Vm2 of the preceding ink droplet 26B. The ink droplets 26A to 26C coalesce in the air. The coalescent ink droplet lands on a medium PA. The ink droplet 26C may coalesce with the ink droplets 26A and 26B at a distance of, for example, 0.5 mm from the nozzle surface 25*a*. The ink droplet 26C may coalesce with the ink droplets 26A and 26B at a distance of, for example, 0.5 mm or less from the nozzle surface 25*a*. The ink droplet 26C may coalesce with the ink droplets 26A and 26B at a distance of, for example, less than ½ of the distance from the nozzle surface 25*a* to the medium PA. The distance from the nozzle surface 25*a* to the medium PA may be, for example, 2 mm or more and 3 mm or less. As a result, even when a mist is generated by ejection of the ink droplets 26A and 26B ejected by the ejection pulses Pw1 and Pw2, the ink droplet 26C absorbs the mist to restrict diffusion of the mist into the liquid ejecting apparatus 1, and the coalescence increases the weight of the ink droplet to surely make the ink droplet travel straight and restrict landing deviation.

In such a liquid ejecting apparatus 1, the potential variation amount per unit time of a contraction element c3 of the ejection pulse Pw3 is made larger than the potential variation amount per unit time of a contraction element c1 of the ejection pulse Pw1 to make the speed Vm3 of the ink droplet 26C faster than the speed Vm1 of the ink droplet 26A to make the ink droplets 26A to 26C coalesce. In addition, even when the speed Vm3 of the ink droplet 26C is made faster than the speed Vm1 of the ink droplet 26A, the length of a period Tab3 of the ejection pulse Pw3 is made to be a length that is longer than 0.5 and less than 1.0 multiplied by the natural-vibration cycle Tc to restrict the generation of a mist due to the ejection of the ink droplet 26C ejected by the ejection pulse Pw3. As a result, in the present embodiment, the generation of a mist from the ink droplets 26A to 26C is restricted. Even when in the liquid ejecting apparatus 1, the speed Vm3 of the ink droplet 26C is increased, the speed difference between speeds of a leading end and a trailing end of the ink droplet 26C is restricted to restrict the formation of a liquid column formed by the ink droplet 26C. Therefore, the generation of satellite droplets and a mist is restricted.

According to the liquid ejecting apparatus 1, the generation of a mist is restricted to restrict a decrease in printing quality.

In the present embodiment, in the contraction element c3 of the ejection pulse Pw3, the potential variation amount per unit time in variation in potential from a potential V1 to a potential V2 is made larger than the potential variation amount per unit time in the contraction element c1 of the ejection pulse Pw1 to make the ink droplets 26A to 26C coalesce. However, a final potential in the contraction element c3 of the ejection pulse Pw3 may be made higher than the potential V2 to make the speed Vm3 of the ink droplet 26C faster than the speed Vm1 of the ink droplet 26A. The potential of the end of the contraction element c3 of the ejection pulse Pw3 may be higher than the potential of the end of the contraction element c1 of the ejection pulse Pw1. The potential of a contraction-maintaining element d3 of the ejection pulse Pw3 may be higher than the potential of a contraction-maintaining element d1 of the ejection pulse Pw1.

To improve the speeds Vm1 to Vm3 of the ink droplets 26A to 26C ejected from the nozzle N, potential variation amounts of the ejection pulses Pw1 to Pw3 are increased, or potential variation amounts per unit time of the ejection pulses Pw1 to Pw3 are increased. However, the pulse correction has a limit value due to the characteristics of the ejecting section 10 and the performance of the driving-signal generation circuit 60. Therefore, the speeds Vm1 to Vm3 have upper limits.

Next, results of simulations that varied in a condition of an ejection pulse Pw3 will be described with reference to FIGS. 14 and 15. As illustrated in FIGS. 14 and 15, performed were simulations that varied in the length of a period Tab3 that is the sum of an expansion element a3 and an expansion-maintaining element b3 of an ejection pulse Pw3. In the simulations, behaviors of ink droplets ejected from the nozzles N at a time when a driving signal Com1 was supplied to the driving element 50, as illustrated in FIG. 12, were verified.

As the verification, a determination of aerial coalescence of the ink droplets, a determination of a tail, a determination of a mist, and a comprehensive determination were performed. In a determination of aerial coalescence, when ink droplets 26A to 26C coalesced before the preceding ink droplet 26A landed on a medium PA, and the coalescent position was 0.5 mm or less from the nozzle surface 25*a*, the determination was "A". When ink droplets 26A to 26C coalesced before the preceding ink droplet 26A landed on a medium PA, and the coalescent position was more than 0.5 mm and 1.0 mm or less from the nozzle surface 25*a*, a determination of aerial coalescence was "B". When ink droplets 26A to 26C coalesced before the preceding ink droplet 26A landed on a medium PA, and the coalescent position was more than 1.0 mm from the nozzle surface 25*a*, a determination of aerial coalescence was "C". When ink droplets 26A to 26C did not coalesce before the ink droplet 26A landed on a medium PA, a determination of aerial coalescence was "D". When ink droplets 26A to 26C do not coalesce before landing on a medium PA, the landing positions of the ink droplets 26A to 26C deviate.

In a determination of a tail of an ink droplet, when a tail portion was absorbed by a main droplet or a satellite droplet immediately after an ink droplet 26C was ejected from the nozzle N, the determination was "A". For example, a determination of a tail is "A" for the model 3 illustrated in FIG. 11. FIG. 11 illustrates a main droplet 101, satellite droplets 100*d* and 100*e*, a tail portion 103, and a mist 100*f*. Note that FIG. 13 illustrates only main droplets 101. As illustrated in FIG. 11, the main droplet 101 includes a leading end 100*a* of an ink droplet 100. Further, the main droplet 101 is rounded and has a predetermined volume. At time t204 of the model 1, the satellite droplets 100*d* and 100*e* have been generated. The satellite droplets 100*d* and 100*e* travel behind the main droplet 101 and have volumes smaller than the volume of the main droplet 101.

The tail portion 103 includes a portion extending backward from the main droplet 101 or the satellite droplets 100*d* and 100*e*. The tail portion 103 extends linearly, for example. The linearly-extending portion may form, for example, a column shape or a thread shape. For example, the tail portion 103 has been formed at time t203 of the model 1. The tail portion 103 has been formed at time t202 of the model 2. The tail portion 103 has a width narrower than, for example, the width of the main droplet 101 or the satellite droplets 100*d* and 100*e*. The "width" used herein is a length in a direction orthogonal to the traveling direction of the main droplet 101.

When in a determination of a tail of an ink droplet, a tail portion was satellite droplets and a small amount of mist, the determination was "B". For example, a determination of a tail of an ink droplet may be "B" when the length of a tail portion 103 from a main droplet 101 or satellite droplets 100*d* and 100*e* is 100 μm or less. A determination of a tail is "B" for the model 2 illustrated in FIG. 11.

When in a determination of a tail of an ink droplet, a tail portion was satellite droplets and a large amount of mist, the determination was "C". For example, a determination of a tail of an ink droplet may be "C" when the length of a tail portion 103 from a main droplet 101 or satellite droplets 100*d* and 100*e* exceeds 100 μm. A determination of a tail is "C" for the model 1 illustrated in FIG. 11.

In a determination of a mist, when a mist was hardly generated, the determination was "A". A determination of a mist is "A" for the models 2 and 3. When a mist was generated within an allowable level, a determination of a mist was "B". For example, a determination of a mist may be "B" when a small amount of mist is generated but does not cause any problem in normal use. A determination of a mist is "C" when a mist is generated and causes a defect. For example, when a mist is generated and is scattered in the liquid ejecting apparatus 1, a defect occurs.

A comprehensive determination is based on results of a determination of aerial coalescence, a determination of a tail, and a determination of a mist. A comprehensive determination was "A" when a mist hardly caused an operation failure or an image quality failure during printing, and the printing was optimal for the liquid ejecting apparatus 1. A comprehensive determination was "B" when a mist might cause an operation failure or an image quality failure during printing, but the operation failure or the image quality failure was within an allowable level and did not particularly cause any problem in practical use, and the liquid ejecting apparatus 1 could be used. A comprehensive determination was "C" when the liquid ejecting apparatus 1 could not be used.

FIG. 14 illustrates verification results by simulations for Examples 1 to 6 and Comparative Examples 1 and 2. Periods Tab3 of final ejection pulses Pw3 of Examples 1 to 6 are 0.50Tc, 0.60Tc, 0.70Tc, 0.80Tc, 0.90Tc, and 1.00Tc, respectively. Periods Tab3 of Comparative Examples 1 and 2 are 0.40Tc and 1.10Tc.

For Example 1, a determination of aerial coalescence was "A", a determination of a tail was "B", and a determination of a mist was "B". A comprehensive determination for Example 1 was "B". For Example 2, a determination of aerial coalescence was "A", a determination of a tail was "B", and a determination of a mist was "A". A comprehensive determination for Example 2 was "A". For Example 3, a determination of aerial coalescence was "B", a determination of a tail was "B", and a determination of a mist was "A". A comprehensive determination for Example 3 was "A". For Examples 4 to 6, determinations of aerial coalescence were "C", determinations of a tail were "A", and determinations of a mist were "A". Comprehensive determinations for Examples 4 to 6 were "B".

For Comparative Example 1, a determination of aerial coalescence was "A", a determination of a tail was "C", and a determination of a mist was "C". A comprehensive determination for Comparative Example 1 was "C". For Comparative Example 2, a determination of aerial coalescence was "D", a determination of a tail was "B", and a determination of a mist was "B". A comprehensive determination for Comparative Example 2 was "C".

FIG. 15 illustrates verification results by simulations for Examples 7 to 15. Periods Tab3 of final ejection pulses Pw3 of Examples 7 to 15 are 0.53Tc, 0.56Tc, 0.59Tc, 0.62Tc, 0.65Tc, 0.68Tc, 0.71Tc, 0.74Tc, and 0.77Tc, respectively.

For Example 7, a determination of aerial coalescence was "A", a determination of a tail was "B", and a determination of a mist was "B". A comprehensive determination for Example 7 was "B". For Examples 8 to 12, determinations of aerial coalescence were "A", determinations of a tail were "B", and determinations of a mist were "A". Comprehensive determinations for Examples 8 to 12 were "A". For Example 13, a determination of aerial coalescence was "B", a determination of a tail was "B", and a determination of a mist was "A". A comprehensive determination for Example 13 was "B". For Example 14, a determination of aerial coalescence was "B", a determination of a tail was "B", and a determination of a mist was "A". A comprehensive determination for Example 14 was "B". For Example 15, a determination of aerial coalescence was "C", a determination of a tail was "A", and a determination of a mist was "A". A comprehensive determination for Example 15 was "B".

The comprehensive determinations for Examples 2, 3, and 8 to 12 are "A". Examples 2, 3, and 8 to 12 are optimal as the liquid ejecting apparatus 1. The comprehensive determinations for Examples 1, 4 to 7, and 13 to 15 are "B". Examples 1, 4 to 7, and 13 to 15 are within an allowable level of the liquid ejecting apparatus 1.

In the liquid ejecting apparatus 1, even when a mist is generated from preceding ink droplets 26A and 26B, the mist is absorbed by a final ink droplet 26C.

Since ink droplets 26A to 26C coalesce before the ink droplets 26A to 26C land on a medium PA, the liquid ejecting apparatus 1 makes the weight of the coalescent droplet equal or more than a specific amount. The liquid ejecting apparatus 1 increases the weight of the coalescent droplet. The liquid ejecting apparatus 1 makes the weight of the coalescent droplet equal or more than a specific amount to make the coalescent droplet travel straighter. As a result, a flying ink droplet is prevented from curving, and the accuracy of the landing position of the ink droplet is improved.

While restricting the generation of a mist, the liquid ejecting apparatus 1 increases the speed of the ink droplet 26C ejected later to make the plurality of ink droplets 26A to 26C coalesce.

It should be noted that the above-described embodiment is merely a representative mode of the present disclosure, and the present disclosure is not limited to the above-described embodiment, and various modifications and additions can be made without departing from the gist of the present disclosure.

In the above-described embodiment, the liquid ejecting apparatus 1 is described as a serial-type ink jet printer, but the liquid ejecting apparatus 1 is not limited to the serial-type ink jet printer. The liquid ejecting apparatus 1 may be a line-type ink jet printer in which a plurality of liquid ejecting sections 20 is linearly arranged.

In the above-described embodiment, a driving signal includes a plurality of ejection pulses Pw, but a driving signal may include a plurality of driving pulses that do not eject an ink from the nozzle N. For example, a non-ejection pulse that does not eject an ink may be included between ejection pulses Pw1 and Pw2.

Although in the above-described embodiment, a driving signal Com1 is described as including ejection pulses Pw1 to Pw3, the driving signal Com1 is not limited to the example. For example, a driving signal Com1 may include ejection pulses Pw1 and Pw3, or may include ejection pulses Pw2 and Pw3. The number of preceding ejection pulses may be one or three or more.

In the above-described embodiment, a period Tab1, which is a time width of the sum of an expansion element a1 and an expansion-maintaining element b1 of an ejection pulse Pw1, and a period Tab2, which is a time width of the sum of an expansion element a2 and an expansion-maintaining element b2 of an ejection pulse Pw2, are exemplified as being longer than a length that is 0.5 multiplied by the natural-vibration cycle Tc. However, the periods Tab1 and Tab2 may be a length that is equal to or less than 0.5 multiplied by the natural-vibration cycle Tc. In the above-described embodiment, the periods Tab1 and Tab2 are exemplified as being shorter than a length that is 1.0 multiplied by the natural-vibration cycle Tc, but the period Tab1 may be a length that is 1.0 or more multiplied by the natural-vibration cycle Tc. The lengths of the periods Tab1 and Tab2 are set so that the ejection pulses Pw1 and Pw2 provide respective ink droplets having weights of desired amounts. As a result, even when satellite droplets or a mist is generated by ejection of ink droplets ejected by ejection pulses Pw1 and Pw2, the satellite droplets or the mist is absorbed by an ejection pulse Pw3 to become a coalescent droplet, and the generation of the satellite droplets or the mist is restricted. In particular, the period Tab1 of the ejection pulse Pw1 and the period Tab2 of the ejection pulse Pw2 are made to be shorter than a period Tab3 of the ejection pulse Pw3 so that a preceding ejection pulse ensures the weight of an ink droplet, and a final ejection pulse restricts satellite droplets and a mist, to obtain a coalescent droplet for which landing position deviation and a mist are restricted.

The liquid ejecting apparatus 1 exemplified in the above-described embodiment can be used in various equipment, such as a facsimile apparatus and a copying apparatus, in addition to equipment only for printing. However, an application of the liquid ejecting apparatus according to the present disclosure is not limited to printing. For example, a liquid ejecting apparatus that ejects a solution of a coloring material is used as a manufacturing apparatus that forms a color filter of a display apparatus, such as a liquid crystal display panel. In addition, a liquid ejecting apparatus that ejects a solution of a conductive material is used as a manufacturing apparatus that forms wiring and electrodes of a wiring substrate. In addition, a liquid ejecting apparatus that ejects a solution of an organic substance related to a living body is used as, for example, a manufacturing apparatus that manufactures a biochip.

What is claimed is:

1. A liquid ejecting apparatus comprising:

an ejecting section including a nozzle that ejects liquid to be landed on a medium, a pressure chamber that communicates with the nozzle, and a driving element supplied with a driving signal to generate a pressure variation in liquid in the pressure chamber; and a driving-signal generation unit that generates the driving signal, wherein the driving signal includes a plurality of ejection pulses for ejecting a plurality of droplets from the nozzle during one cycle, the plurality of droplets due to the plurality of ejection pulses coalesces before landing on the medium, the plurality of ejection pulses includes a final ejection pulse that corresponds to a final droplet ejected last from the nozzle among the plurality of droplets and a preceding ejection pulse that corresponds to a preceding droplet, among the plurality of droplets, ejected from the nozzle before the final droplet, the preceding ejection pulse includes a first expansion element that expands the pressure chamber, a first expansion-maintaining element that maintains expansion of the pressure chamber by the first expansion element, a first contraction element that contracts the pressure chamber expanded by the first expansion element, and a first vibration-damping element that, after the first contraction element contracts the pressure chamber, expands the pressure chamber to reduce residual vibration of liquid in the pressure chamber, the final ejection pulse includes a second expansion element that expands the pressure chamber, a second expansion-maintaining element that maintains expansion of the pressure chamber by the second expansion element, a second contraction element that contracts the pressure chamber expanded by the second expansion element, and a second vibration-damping element that, after the second contraction element contracts the pressure chamber, expands the pressure chamber to reduce residual vibration of liquid in the pressure chamber, and a time width of a sum of the second expansion element and the second expansion-maintaining element of the final ejection pulse is longer than a length that is 0.5 multiplied by a natural-vibration cycle of the ejecting section, and is shorter than a length that is 1.0 multiplied by the natural-vibration cycle of the ejecting section.

2. The liquid ejecting apparatus according to claim 1, wherein the time width of the sum of the second expansion element and the second expansion-maintaining element of the final ejection pulse is a length that is 0.56 or more and 0.68 or less multiplied by the natural-vibration cycle of the ejecting section.

3. The liquid ejecting apparatus according to claim 1, wherein a time width of a sum of the first expansion element and the first expansion-maintaining element of the preceding ejection pulse is longer than a length that is 0.5 multiplied by the natural-vibration cycle of the ejecting section, and is shorter than a length that is 1.0 multiplied by the natural-vibration cycle of the ejecting section.

4. The liquid ejecting apparatus according to claim 1, wherein a time width of a sum of the first expansion element and the first expansion-maintaining element of the preceding ejection pulse is shorter than the time width of the sum of the second expansion element and the second expansion-maintaining element of the final ejection pulse.

5. The liquid ejecting apparatus according to claim 1, wherein a potential variation amount per unit time of the second contraction element of the final ejection pulse is larger than a potential variation amount per unit time of the first contraction element of the preceding ejection pulse.

* * * * *